June 9, 1953   L. B. GENEBACH   2,641,247
ADJUSTABLE OVEN OR BROILER RACK
Filed July 7, 1950   2 Sheets-Sheet 1

INVENTOR.
Lowell B. Genebach
BY
Otto A. Earl
Attorney.

June 9, 1953 — L. B. GENEBACH — 2,641,247
ADJUSTABLE OVEN OR BROILER RACK
Filed July 7, 1950 — 2 Sheets-Sheet 2
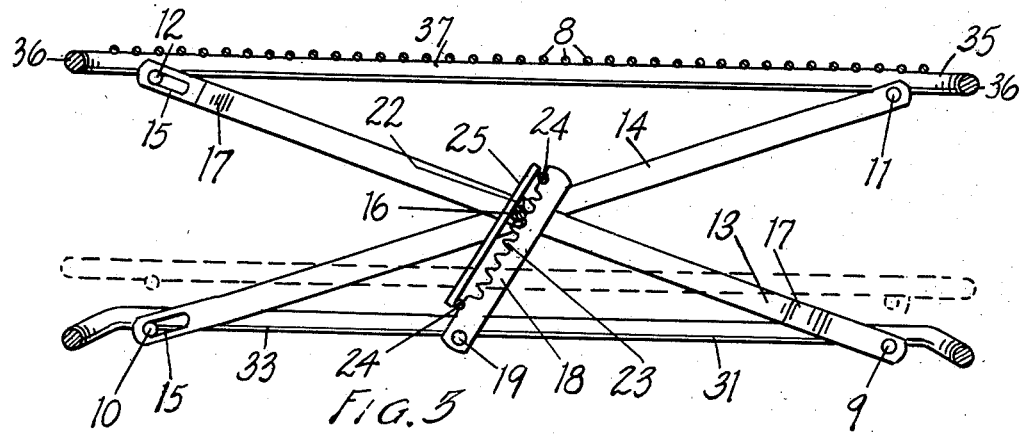
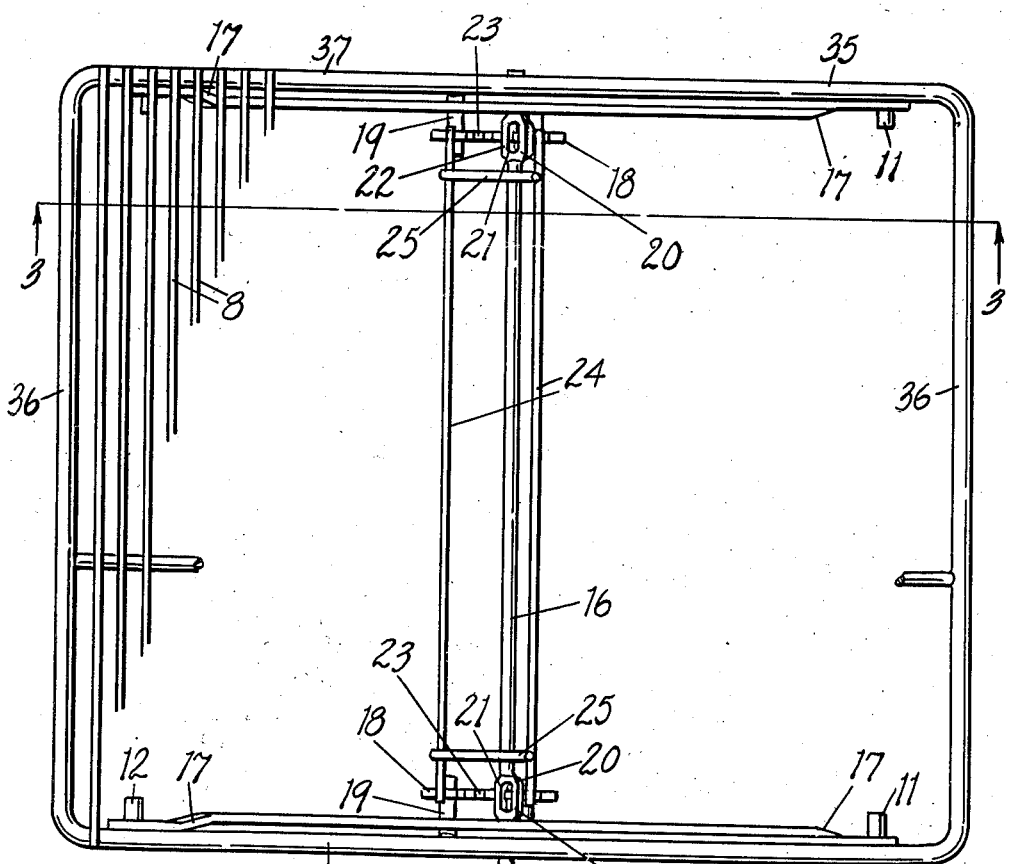
INVENTOR.
Lowell B. Genebach
BY Otto A. Earl
Attorney.

Patented June 9, 1953

2,641,247

UNITED STATES PATENT OFFICE 2,641,247

ADJUSTABLE OVEN OR BROILER RACK

Lowell B. Genebach, Battle Creek, Mich., assignor to United Steel & Wire Company, Battle Creek, Mich.

Application July 7, 1950, Serial No. 172,541

8 Claims. (Cl. 126—337)

This invention relates to improvements in an adjustable oven or broiler rack.

The principal objects of this invention are:

First, to provide an adjustable oven or broiler rack which may be readily adjusted from the front of the rack to vary the vertical position of the grid relative to the burner.

Second, to provide a structure having these advantages in which the grid is effectively supported in its adjusted position throughout the full range of adjustment thereof.

Third, to provide an oven or broiler rack which is well adapted for use in connection with broiler and oven structures now in quite extended commercial use.

Objects relating to details and economies of the invention will appear from the description to follow. The invention is defined and pointed out in the claims.

A preferred embodiment of the invention is illustrated in the accompanying drawings, in which:

Fig. 3 is a transverse section on a line corresponding to line 3—3 of Fig. 4 with the grid shown in fully elevated position by full lines and in lowered position by dotted lines.

Fig. 4 is a fragmentary plan view of the rack of my invention.

Figure 2:
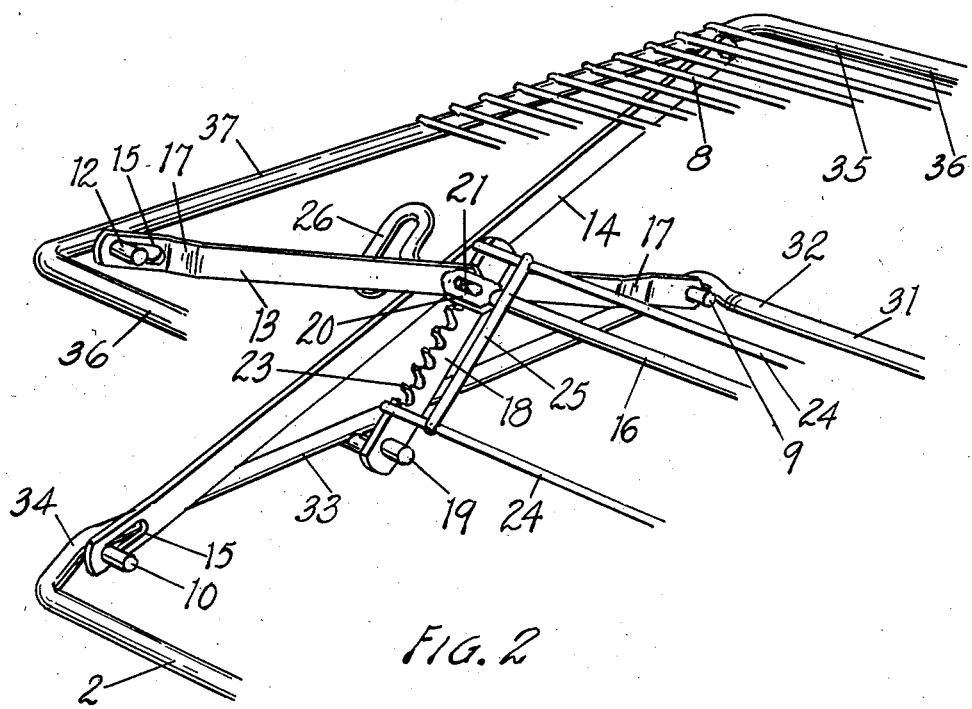
Fig. 2 is a fragmentary perspective view of the rack with the grid in elevated position.
Figure 1:
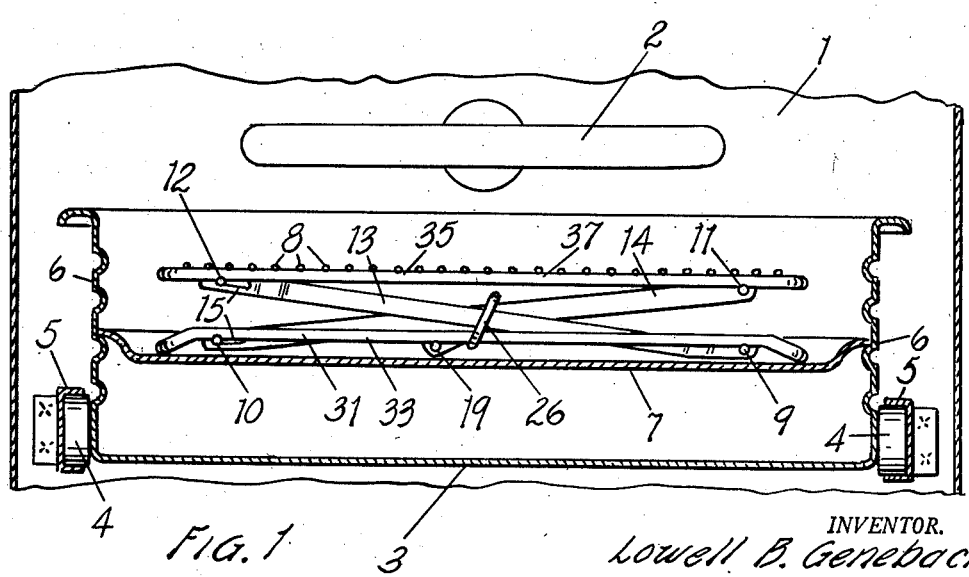
Fig. 1 is a fragmentary view partially in vertical transverse section of the oven or broiler rack of my invention in operative relation within an oven or broiler chamber and to the burner.

In the accompanying drawing 1 represents an oven or broiler chamber and 2, a burner. The broiler pan 3 illustrated is provided with rollers 4 coacting with rails 5 whereby the pan is supported for reciprocating movement within the chamber. The walls of the pan are provided with opposed ledges 6 with which the drip pan 7 may be selectively engaged. These parts form no part of my present invention, but I have illustrated the oven or broiler rack of my invention in operative relation thereto to show one adaptation or use of the structure of my invention.

The embodiment of my invention illustrated comprises a base frame designated generally by the numeral 31 and comprises side members 32 and end members 33, the end members being upwardly offset at 34 relative to the side members. The grid designated generally by the numeral 35 consists of a border frame comprising side members 36 and end members 37, and the grid bars 8 secured to the upper sides of the end members 37 desirably by welding thereto, the welds not being illustrated.

The base is provided with inwardly projecting pins 9 and 10 secured to the under sides of their end members, desirably by welding. The grid end members have corresponding pins 11 and 12 secured to the under sides of the end members of the grid frame. Pairs of grid supporting links 13 and 14 are provided, one end of each pair being pivotally engaged at one end with the corresponding pins 9 and 11 and are slotted at their opposite ends at 15 to pivotally and slidably engage the pins 10 and 12. The links are pivotally connected to each other at their corresponding point by means of adjusting rod 16 which is provided with a finger piece 26 at its front end disposed forwardly of the base and grid. To permit the swinging and collapsing of the links in side by side relation, one link of each pair is provided with offsets 17 adjacent its ends.

Adjusting racks 18 are pivotally mounted on the pins 19 on the end members of the frame. In the embodiment illustrated, the adjusting rod 16 has flattened portions 20 aligned with the racks 18 and longitudinally slotted at 21 thereby providing teeth 22 coacting with the teeth 23 of the racks 18.

To support the racks 18 and maintain their teeth 23 in operative engagement with the teeth of the adjusting rod, I provide the racks with tie rods or connecting rods 24 which are secured to the racks and disposed on opposite sides of the adjusting rod 16. The cross pieces 25 extending between the tie rods 24 are disposed to engage the adjusting rod in opposed relation to the racks thereby maintaining the adjusting racks in cooperative relation to the teeth of the adjusting rod. When the flat sides of the flattened portions 20 of the adjusting rod 16 are in flat engaging relation with the racks 18 as shown in Fig. 2 the grid 35 is securely held in adjusted position. The flattened portions 20 in flat engaging relation to the racks 18 offer such resistance to turning of the adjusting rod 16 that the same cannot be readily turned except by turning the finger piece 26 thereof.

By rotating the adjusting rod, the pivot connections for the links is raised or lowered thereby raising or lowering the grid. The links in all positions stabilize the grid; that is, they hold the grid against swaying movement. By pivotally mounting the adjusting racks upon the base, they are collapsed with the lowering of the grid and do not project above the grid in any position of adjustment.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

Having thus described my invention, what I claim as new and desire to secure by Letters Patent is:

1. In an oven or broiler rack, the combination of a base frame comprising parallel side members and end members connecting said side members and upwardly offset relative thereto, a grid disposed above said base frame and having a border frame comprising side and end members, the dimensions of said grid approximating those of the base frame, pins secured to the undersides of the end members of said base frame and grid to project inwardly therefrom, pairs of crossed links pivotally mounted at one end on corresponding pins on said base frame and grid and having longitudinal slots at their other ends engaging other corresponding pins on said base frame and grid, an adjusting rod pivotally connecting said pairs of crossed links and rotatably supported thereby, adjusting racks having teeth, said racks being disposed parallel to each other, one being pivotally connected to one base end member and the other being pivotally connected to the opposite base end member, said adjusting rod having teeth coacting with the teeth of said adjusting racks, tie rods connected at their opposite ends to said adjusting racks and disposed on opposite sides of said adjusting rod, and cross members on said tie rods disposed to engage said adjusting rod in opposed relation to said racks and maintaining the teeth thereof in engagement with the teeth of said adjusting rod.

2. In an oven or broiler rack, the combination of a base frame comprising end members, a grid disposed above said base frame and having a border frame comprising end members, pins secured to the undersides of the end members of said base frame and grid to project inwardly therefrom, pairs of crossed links pivotally mounted at one end on corresponding pins on said base frame and grid and having longitudinal slots at their other ends engaging other corresponding pins on said base frame and grid, an adjusting rod pivotally connecting said pairs of crossed links and rotatably supported thereby, said rod being provided with a finger piece at its front end, adjusting racks having teeth, said racks being disposed parallel to each other, one being pivotally connected to one base end member and the other being pivotally connected to the opposite base end member, said adjusting rod having flattened and slotted portions constituting teeth coacting with the teeth of said adjusting racks, tie rods connected at their opposite ends to said adjusting racks and disposed on opposite sides of said adjusting rod, and cross members on said tie rods disposed to engage said adjusting rod in opposed relation to said racks and maintaining the teeth thereof in engagement with the teeth of said adjusting rod.

3. In an oven or broiler rack, the combination of a base frame comprising parallel side members and end members connecting said side members and upwardly offset relative thereto, a grid disposed above said base frame and having a border frame comprising side and end members, the dimensions of said grid approximating those of the base frame, pins secured to the undersides of the end members of said base frame and grid to project inwardly therefrom, pairs of crossed links pivotally mounted at one end on corresponding pins on said base frame and grid and having longitudinal slots at their other ends engaging other corresponding pins on said base frame and grid, an adjusting rod pivotally connecting said pairs of crossed links and rotatably supported thereby, and adjusting racks having teeth, said racks being disposed parallel to each other, one being pivotally connected to one base end member and the other being pivotally connected to the opposite base end member, said adjusting rod having teeth coacting with the teeth of said adjusting racks, said racks being provided with means disposed in engaging relation with said adjusting rod on the side thereof opposite from the teeth of the racks for retaining the teeth of the racks in meshing relation with the teeth of the adjusting rod.

4. In an oven or broiler rack, the combination of a base, a grid disposed above said base, spaced pairs of crossed links pivotally connected at one end to said base and grid and having pivoted and sliding connection thereto at their other ends, an adjusting rod pivotally connecting said pairs of crossed links and rotatably supported thereby, said rod being provided with a finger piece at its front end, adjusting racks having teeth, said racks being disposed in spaced parallel relation to each other and pivotally mounted on said base, said adjusting rod having flattened and slotted portions constituting teeth coacting with the teeth of said adjusting racks, tie rods connected at their opposite ends to said adjusting racks and disposed on opposite sides of said adjusting rod, and cross members on said tie rods disposed to engage said adjusting rod in opposed relation to said racks and maintaining the teeth thereof in engagement with the teeth of said adjusting rod.

5. In an oven or broiler rack, the combination of a base, a grid disposed above said base, spaced pairs of crossed links pivotally connected at one end to said base and grid and having pivoted and sliding connection thereto at their other ends, an adjusting rod pivotally connecting said pairs of crossed links and rotatably supported thereby, adjusting racks having teeth, said racks being disposed in spaced parallel relation to each other and pivotally mounted on said base, said adjusting rod having teeth coacting with the teeth of said adjusting racks, tie rods connected at their opposite ends to said adjusting racks and disposed on opposite sides of said adjusting rod, and cross members on said tie rods disposed to engage said adjusting rod in opposed relation to said racks and maintaining the teeth thereof in engagement with the teeth of said adjusting rod.

6. In an oven or broiler rack, the combination of a base, a grid disposed above said base, spaced pairs of crossed links pivotally connected at one end to said base and grid and having pivoted and sliding connection thereto at their other ends, an adjusting rod pivotally connecting said pairs of crossed links and rotatably supported thereby, said rod being provided with a finger piece at its front end, and adjusting racks having teeth, said racks being disposed in spaced parallel relation to each other and pivotally mounted on said base, said adjusting rod having flattened and slotted portions constituting teeth coacting with the teeth of said adjusting racks said racks being provided with means disposed in engaging relation with said adjusting rod on the side thereof opposite from the teeth of the racks for retaining the teeth of the racks in meshing relation with the teeth of the adjusting rod.

7. In an oven or broiler rack, the combination of a base, a grid disposed above said base, spaced pairs of crossed links pivotally connected at one end to said base and grid and having pivoted and sliding connection thereto at their other ends, an adjusting rod pivotally connecting said pairs of crossed links and rotatably supported thereby, and adjusting racks having teeth, said racks being disposed in spaced parallel relation to each other and pivotally mounted on said base, said adjusting rod having teeth coacting with the teeth of said adjusting racks said racks being provided with means disposed in engaging relation with said adjusting rod on the side thereof opposite from the teeth of the racks for retaining the teeth of the racks in meshing relation with the teeth of the adjusting rod.

8. In an oven or broiler rack, the combination of a base, a grid disposed above said base, spaced pairs of crossed links, one end of the links of each pair being pivotally connected to the base and grid, the other ends of the links having a lost motion connection to the base and grid, an adjusting rod pivotally connecting said pairs of crossed links and rotatably supported thereby, and adjusting racks having teeth, said racks being disposed in spaced parallel relation to each other and swingably associated with said base and grid, said rod having teeth cooperating with said racks whereby the grid is raised and lowered relative to the base by the rotative adjustment of the adjusting rod said racks being provided with means disposed in engaging relation with said adjusting rod on the side thereof opposite from the teeth of the racks for retaining the teeth of the racks in meshing relation with the teeth of the adjusting rod.

LOWELL B. GENEBACH.

References Cited in the file of this patent

UNITED STATES PATENTS

| Number | Name | Date |
|---|---|---|
| 870,118 | Miller | Nov. 5, 1907 |
| 1,352,352 | Caswell | Sept. 7, 1920 |
| 1,840,460 | Maul | Jan. 12, 1932 |
| 2,048,102 | Cable et al. | July 21, 1936 |
| 2,119,898 | Weston | June 7, 1938 |

FOREIGN PATENTS

| Number | Country | Date |
|---|---|---|
| 802,888 | France | June 22, 1936 |